(12) United States Patent
Chen

(10) Patent No.: US 10,816,864 B2
(45) Date of Patent: Oct. 27, 2020

(54) METHOD OF MANUFACTURING A DISPLAY PANEL AND AVOIDING PEELING LAYERS

(71) Applicants: HKC Corporation Limited, Shenzhen, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/461,639

(22) PCT Filed: May 5, 2017

(86) PCT No.: PCT/CN2017/083215
§ 371 (c)(1),
(2) Date: May 16, 2019

(87) PCT Pub. No.: WO2018/120570
PCT Pub. Date: Jul. 5, 2018

(65) Prior Publication Data
US 2019/0285957 A1 Sep. 19, 2019

(30) Foreign Application Priority Data
Dec. 30, 2016 (CN) .......................... 2016 1 1256153

(51) Int. Cl.
*G02F 1/1362* (2006.01)
*G02F 1/1333* (2006.01)
(Continued)

(52) U.S. Cl.
CPC ........ *G02F 1/136286* (2013.01); *G02F 1/133* (2013.01); *G02F 1/1303* (2013.01);
(Continued)

(58) Field of Classification Search
CPC .. G02F 1/136286; G02F 1/133; G02F 1/1303; G02F 1/133345; G02F 1/136277;
(Continued)

(56) References Cited

U.S. PATENT DOCUMENTS 8,379,180 B2 * 2/2013 Huang ................ G02F 1/13394
349/106
10,225,458 B2 * 3/2019 Cho ................ H04N 5/232125
(Continued)

FOREIGN PATENT DOCUMENTS

CN 102213877 A 10/2011
CN 102569417 A 7/2012
(Continued)

OTHER PUBLICATIONS

Li_et_al_Chineses_Patent_application_publication_CN105336743A_Feb. 2016_machine_translation.pdf (Year: 2016).*

*Primary Examiner* — Tracie Y Green
(74) *Attorney, Agent, or Firm* — Muncy, Geissler, Olds & Lowe, P.C.

(57) ABSTRACT

A method of manufacturing a display panel includes the following steps of: disposing a first insulating protection layer on a second layer of wires; disposing a second insulating protection layer on the first insulating protection layer, wherein a deposition speed of the first insulating protection layer is lower than a deposition speed of the second insulating protection layer; and disposing color filters on the second insulating protection layer.

20 Claims, 5 Drawing Sheets

(51) Int. Cl.
*G02F 1/13* (2006.01)
*G02F 1/133* (2006.01)

(52) U.S. Cl.
CPC ...... *G02F 1/1333* (2013.01); *G02F 1/133345* (2013.01); *G02F 1/136277* (2013.01); *G02F 2001/136222* (2013.01); *G02F 2001/136295* (2013.01)

(58) Field of Classification Search
CPC ....... G02F 1/1333; G02F 2001/136295; G02F 2001/136222; G02F 2201/50
See application file for complete search history.

(56) References Cited

U.S. PATENT DOCUMENTS

| | | | |
|---|---|---|---|
| 2010/0078746 A1* | 4/2010 | Jung | H01L 27/14683 257/432 |
| 2010/0220117 A1* | 9/2010 | Kimura | G09G 3/3233 345/690 |
| 2016/0104803 A1 | 4/2016 | Ahn et al. | |
| 2018/0088379 A1* | 3/2018 | Fan | H01L 27/156 |

FOREIGN PATENT DOCUMENTS

| | | |
|---|---|---|
| CN | 102593050 A | 7/2012 |
| CN | 105336743 A | 2/2016 |

\* cited by examiner

METHOD OF MANUFACTURING A DISPLAY PANEL AND AVOIDING PEELING LAYERS

BACKGROUND

Technology Field

This disclosure relates to the technical field of a display, and more particularly to a method of manufacturing a display panel.

Description of Related Art

The liquid crystal display has many advantages, such as the thin body, low power consumption, and no radiation, and is widely applied. Most of the liquid crystal displays available in the market are backlight type liquid crystal displays each including a liquid crystal panel and a backlight module. The working principle of the liquid crystal panel is to place the liquid crystal between two parallel glass substrates, and, to apply a driving voltage to the two glass substrates to control the orientation of the liquid crystal, and refract the light emitted from the backlight module to generate an image frame.

The thin-film-transistor liquid crystal display (TTT-LCD) has the properties including the low power consumption, excellent frame quality and higher production yield, and has gradually become the most popular product in the display field. Similarly, the TFT-LCD includes a liquid crystal panel and a backlight module. The liquid crystal panel includes a color filter substrate (CF substrate) and a thin-film-transistor substrate (TFT substrate). The opposite inner sides of the above substrates are configured with transparent electrodes, respectively. A layer of liquid crystal (LC) is interposed between the two substrates. The liquid crystal panel controls the orientation of the liquid crystal through the electric field to change the polarization state of light, and a polarizer is adopted to implement the transmission and obstruction of the light path and thus the displaying objectives.

With the development of the thin-film-transistor liquid crystal display (TFT LCD) toward the oversized, high driving frequency and high resolution trends, the technology of the high-quality wire process has become the master when the TFT LCD is manufactured. In order to handle the future high frequency and high resolution LCD specifications, how to effectively decrease the resistance and the parasitic capacitance of the wire of the panel becomes increasingly important. At present, the poor sticky property of the wires tends to occur in the wire metal structure in the process of forming the second layer of wires, thereby causing the problem of peel off of the metal film.

With the development of the TFT LCD toward the oversized, high driving frequency and high resolution trends and in order to coordinate with the development of high-precision panel, the aperture ratio of the TFT can be increased using the color filter on array (COA) technology to effectively enhance the panel's brightness, wherein the phenomenon that one insulating protection layer, a second layer of copper wires and the insulating protection layer tend to peel off may occur between the color filters and the second layer of wires.

SUMMARY

The technical problem to be solved by this disclosure is to provide a method of manufacturing a display panel and solving the problem that a second layer of wires and an insulating protection layer tend to peel off.

An objective of this disclosure is achieved by the following technical solution: a method of manufacturing a display panel comprises steps of: disposing a first insulating protection layer on a second layer of wires; disposing a second insulating protection layer on the first insulating protection layer, a deposition speed of the first insulating protection layer being lower than a deposition speed of the second insulating protection layer; and disposing color filters on the second insulating protection layer.

In one embodiment, the first insulating protection layer and the second insulating protection layer are formed by depositing the same one material.

The first insulating protection layer and the second insulating protection layer are formed by depositing the same one material, wherein only the deposition speeds are different, additional raw materials are not needed, the raw material cost and the storage cost are decreased, no new material needs to be added to the bill of materials, it is convenient to the flow manage and purchase, no additional apparatus for disposing the first insulating protection layer is needed, and one set of equipment apparatus may be shared in forming the first and second insulating protection layers.

In one embodiment, a thickness of the first insulating protection layer is less than a thickness of the second insulating protection layer.

The thickness of the first insulating protection layer is less than the thickness of the second insulating protection layer, so that the cost can be saved and the thickness of the display panel can be reduced.

In one embodiment, a thickness of the first insulating protection layer is less than 1000 angstroms.

The cost can be saved and the thickness of the display panel can be reduced. Optionally, the second insulating protection layer can correspondingly reduce the thickness corresponding to the first insulating protection layer without increasing the thickness of the display panel, and can facilitate the thinning of the display panel.

In one embodiment, a width of the first insulating protection layer is greater than a width of a top portion of the second layer of wires.

The width of the first insulating protection layer is greater than the width of the top portion of the second layer of wires, so that the second layer of wires may be in contact with the first insulating protection layer with a maximum area, and the adhesive fixation effect between the second layer of wires and the first insulating protection layer can be improved.

In one embodiment, the first insulating protection layer, the second insulating protection layer and the color filters have the same width.

It is convenient to the operation, and tends to implement that the first insulating protection layer, the second insulating protection layer and the color filters have the same width, and the width of the color filters is greater than the width of the top portion of the second layer of wires. Of course and optionally, the width of the color filters may be greater than the width of the bottom portion of the second layer of wires to shelter the second layer of wires, and provide the effect of the black matrix (BM) very well.

In one embodiment, the second layer of wires comprise, from bottom to top in order, a first molybdenum metal layer, a copper metal layer and a second molybdenum metal layer.

In one embodiment, a method of manufacturing the display panel further comprises steps of: disposing a first layer of wires on a substrate; disposing a substrate insulating layer on the first layer of wires; disposing a semiconductor layer, corresponding to the first layer of wires, on the substrate insulating layer; and disposing the second layer of wires on the semiconductor layer.

The second layer of wires are configured as three layers of structures of molybdenum, copper and molybdenum. The uppermost layer is the second molybdenum metal layer having the better adhesive sticky property, the middle layer is a metal copper or copper alloy having a lower resistance characteristic to effectively reduce the resistance and the parasitic capacitance of the second layer of wires of the display panel, and the first molybdenum metal layer and the second molybdenum metal layer of the second layer of wires use a metal molybdenum or molybdenum alloy having a better adhesion performance, so that the intermediate copper metal layer may be well stuck and fixed to the first molybdenum metal layer and the second molybdenum metal layer. Meanwhile, the intermediate copper metal layer may further be stuck and fixed to the upper and lower layers through the first molybdenum metal layer and the second molybdenum metal layer to have the better sticky property. The peeling of the intermediate copper metal layer and the upper and lower layers cannot be easily caused, the electrical performance of the second layer of wires of the display panel can be well satisfied, the sticking and fixing to the upper and lower layers can be achieved, the product yield can be enhanced, and the manufacturing cost can be decreased.

A first insulating protection layer and a second insulating protection layer are disposed between the second layer of wires and the color filters, wherein a deposition speed of the first insulating protection layer is lower than a deposition speed of the second insulating protection layer, so that the first insulating protection layer having the sticky property better than that of the second insulating protection layer can be implemented, and that the first insulating protection layer can be well stuck and combined with the second layer of wires and the second insulating protection layer. The problem of the poor combination between the second layer of wires and the second insulating protection layer can be improved to avoid the problem of the peeling of the film or layer. Thus, the COA process quality can be improved, the product yield can be enhanced, and the manufacturing cost can be decreased. The first insulating protection layer that is insulation and non-conductive does not affect the electrical performance of the second layer of wires, the second insulating protection layer needs not to be changed, and it is only necessary to add a first insulating protection layer between the second insulating protection layer and the second layer of wires. The process change is small, and the influence to the method of manufacturing the display panel is smaller, thereby ensuring the stability of the display panel. There are two insulating protection layers disposed between the second layer of wires and the color filters, so that the second layer of wires can be well isolated and protected from the color filters.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

Figure 1:
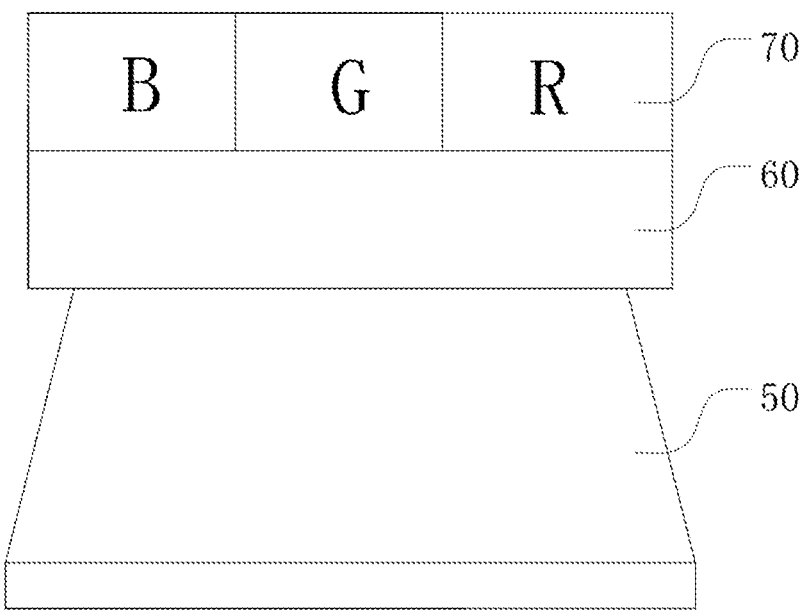
FIG. 1 is a schematic view showing a partial structure of a display panel according to one embodiment of this disclosure.

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

In the description of this disclosure, it is to be understood that the terms "center", "transversal" "up," "down," "left," "right," "vertical", "horizontal", "top," "bottom," "inside" and "outside" indicating the orientation or position relationships are the orientation or position relationships based on the drawing, are only provided for the purposes of describing this disclosure and simplifying the description, but do not indicate or imply that the directed devices or elements must have the specific orientations or be constructed and operated in the specific orientations, and thus cannot be understood as the restriction to this disclosure. In addition, the terms "first," and "second" are used for the illustrative purpose only and cannot be understood as indicating or implying the relative importance or implicitly specifying the number of indicated technical features. Therefore, the features restricted by "first" and "second" may expressly or implicitly comprise one or multiple ones of the features. In the description of this disclosure, unless otherwise described, the meaning of "multiple" comprises two or more than two. In addition, the terms "comprises" and any modification thereof intend to cover the non-exclusive inclusions.

In the description of this disclosure, it needs to be described that, unless otherwise expressly stated and limited, the terms "mount," "link" and "connect" should be broadly understood. For example, they may be the fixed connection, may be the detachable connection or may be the integral connection; may be the mechanical connection or may also be the electrical connection; or may be the direct connection, may be the indirect connection through a middle medium or may be the inner communication between two elements. It will be apparent to those skilled in the art that the specific meanings of the above terms in this application may be understood according to the specific conditions.

The terms used herein are for the purpose of describing only specific embodiments and are not intended to limit the exemplary embodiments. Unless the contexts clearly indicate otherwise, the singular form "one," "a" and "an" used here further intend to include plural forms. It should also be understood that the terms "comprising" and/or "including"

are used herein to describe the features to describe the presence of stated features, integers, steps, operations, units and/or elements without excluding the presence or addition of one or more other features, integers, steps, operations, units, elements, and/or combinations thereof.

This disclosure will be further described below with reference to the accompanying drawings and preferred embodiments.

Figure 5:
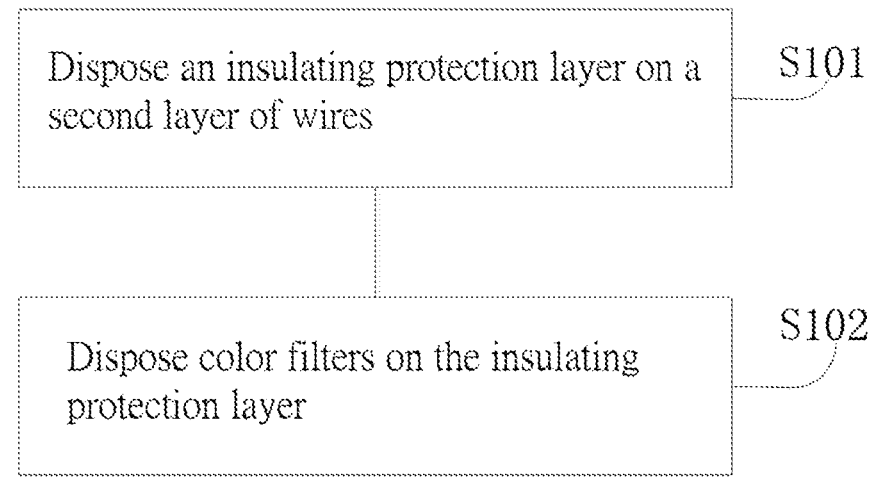
FIG. 5 is a schematic view showing a method of manufacturing a display panel according to the embodiment of this disclosure.

As shown in FIGS. 1 and 5, a method of manufacturing a display panel in an embodiment of FIGS. 1 and 5 comprises steps of disposing an insulating protection layer 60 on a second layer of wires 50, and disposing color filters 70 on the insulating protection layer 60.

The insulation and non-conductive properties of the insulating protection layer 60 do not affect the electrical performance of the second layer of wires 50, and the second layer of wires 50 and the color filters 70 can be isolated and protected from each other very well. However, the second layer of wires 50 and the insulating protection layer 60 tend to peel off. With the development of the TFT LCD toward the oversized, high driving frequency and high resolution trends, and in order to coordinate with the future high frequency and high resolution LCD specifications and in order to coordinate with the development of high-precision panel, the TFT LCD is manufactured using the color filter on array (COA) technology, wherein the aperture ratio of the TFT can be increased, and the main function is to effectively enhance the brightness of the panel. The COA technology is to proceed the process of forming the color filter after the array process on the glass of TFT panel is finished.

Figure 2:
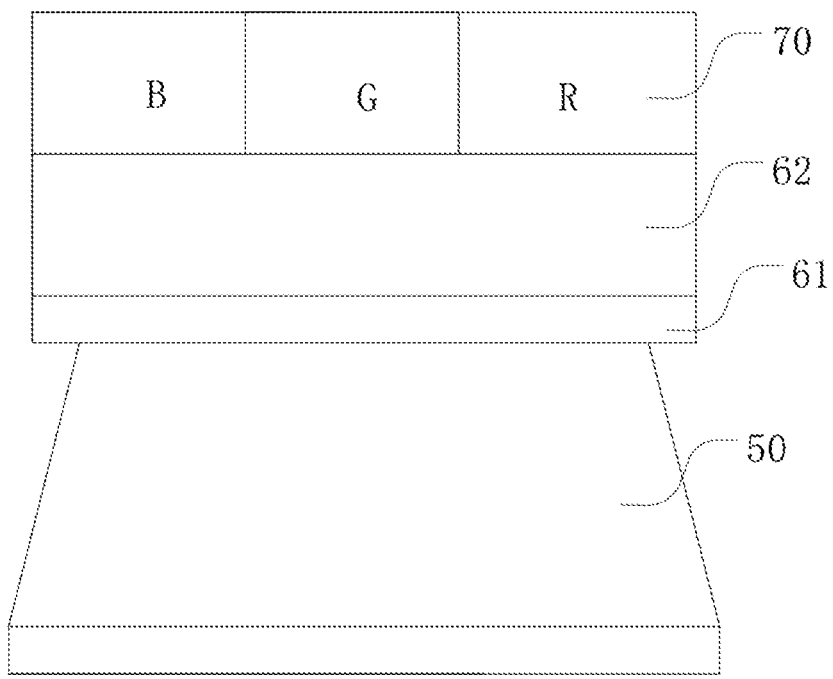
FIG. 2 is another schematic view showing the partial structure of the display panel according to the embodiment of this disclosure.
Figure 6:
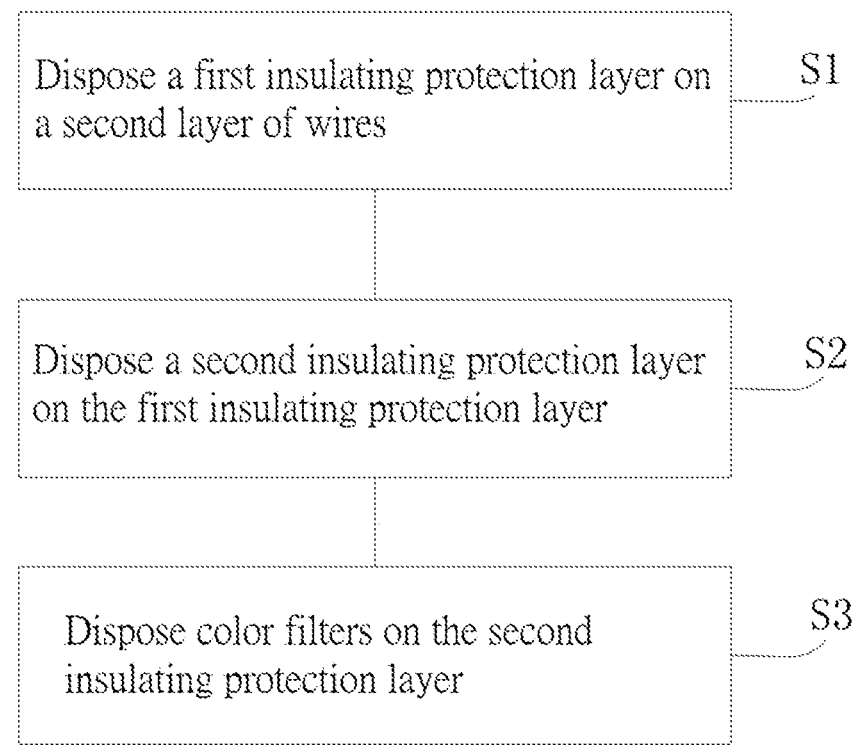
FIG. 6 is a schematic view showing another method of manufacturing the display panel according to the embodiment of this disclosure.

As shown in FIGS. 2 and 6, a method of manufacturing a display panel in the embodiment of FIGS. 2 and 6 comprises steps of: disposing a first insulating protection layer 61 on the second layer of wires 50; disposing a second insulating protection layer 62 on the first insulating protection layer 61, the deposition speed of the first insulating protection layer 61 being lower than the deposition speed of the second insulating protection layer 62; and disposing the color filters 70 on the second insulating protection layer 62.

The first insulating protection layer 61 and the second insulating protection layer 62 being disposed between the second layer of wires 50 and the color filters 70, and the deposition speed of the first insulating protection layer 61 being lower than the deposition speed of the second insulating protection layer 62 can implement that the sticky property of the first insulating protection layer 61 is better than the sticky property of the second insulating protection layer 62, implement that the first insulating protection layer 61 can be well stuck and combined with the second layer of wires 50 and the second insulating protection layer 62, improve the problem of the poor combination between the second layer of wires 50 and the second insulating protection layer 62, and avoid the problem that the film or layer is peeled off. Thus, the COA process quality can be improved, the product yield can be increased, and the manufacturing cost can be decreased. The insulation and non-conductive properties of the first insulating protection layer 61 do not affect the electrical performance of the second layer of wires 50. The second insulating protection layer 62 does not need to change, only one first insulating protection layer 61 needs to be additionally disposed between the second insulating protection layer 62 and the second layer of wires 50, the process change is small, and the influence on the method of manufacturing the display panel is small, thereby ensuring the stability of the display panel. There are two insulating protection layers 60 disposed between the second layer of wires 50 and the color filters 70 so that the second layer of wires 50 and the color filters 70 are well isolated and protected from each other.

The first insulating protection layer 61 and the second insulating protection layer 62 are formed by depositing the same one material. In this embodiment, the first insulating protection layer 61 and the second insulating protection layer 62 are formed by depositing the same one material, but the deposition speeds are different. Additional raw materials are not needed, the raw material cost and the storage cost are decreased, and no new material needs to be added to the bill of materials. It is convenient to the flow manage and purchase. No additional apparatus for disposing the first insulating protection layer 61 is needed, and one set of equipment apparatus may be shared in forming the first insulating protection layer 61 and the second insulating protection layer 62.

A thickness of the first insulating protection layer 61 is less than a thickness of the second insulating protection layer 62. Since the thickness of the first insulating protection layer 61 is less than the thickness of the second insulating protection layer 62, the cost can be saved and the thickness of the display panel can be reduced.

In this embodiment, a thickness of the first insulating protection layer 61 is less than 1000 angstroms. Accordingly, the cost can be saved and the thickness of the display panel can be reduced. Optionally, the second insulating protection layer 62 can correspondingly reduce the thickness corresponding to the first insulating protection layer 61 without increasing the thickness of the display panel, and can facilitate the thinning of the display panel.

An oxide layer, which is less than 1000 Å is slowly grown between the second layer of wires and the second insulating protection layer, and then the first insulating protection layer is rapidly deposited thereon.

The width of the first insulating protection layer 61 is greater than the width of the top portion of the second layer of wires 50, so that the second layer of wires 50 may be in contact with the first insulating protection layer 61 with a maximum area. Accordingly, the adhesive fixation effect between the second layer of wires 50 and the first insulating protection layer 61 can be improved.

The first insulating protection layer 61, the second insulating protection layer 62 and the color filters 70 have the same width. It is convenient to the operation, and tends to implement that the first insulating protection layer 61, the second insulating protection layer 62 and the color filters 70 have the same width, and the width of the color filters 70 is greater than the width of the top portion of the second layer of wires 50. Of course and optionally, the width of the color filters 70 may be greater than the width of the bottom portion of the second layer of wires 50 to shelter the second layer of wires 50 and provide the effect of the black matrix (BM) very well.

Figure 3:
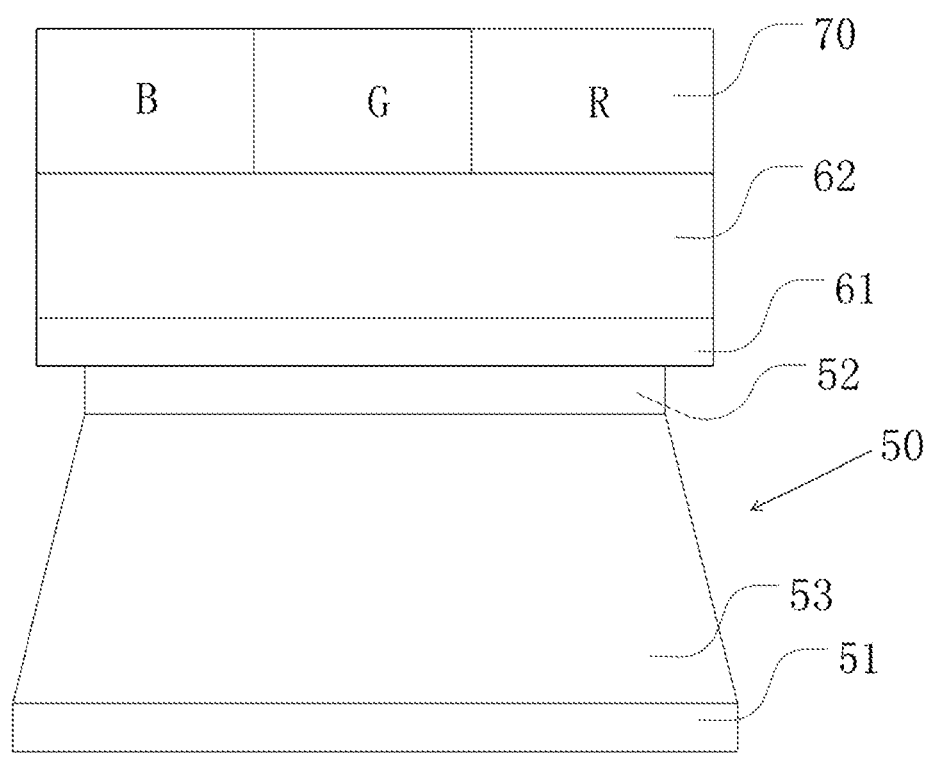
FIG. 3 is still another schematic view showing the partial structure of the display panel according to the embodiment of this disclosure.
Figure 7:
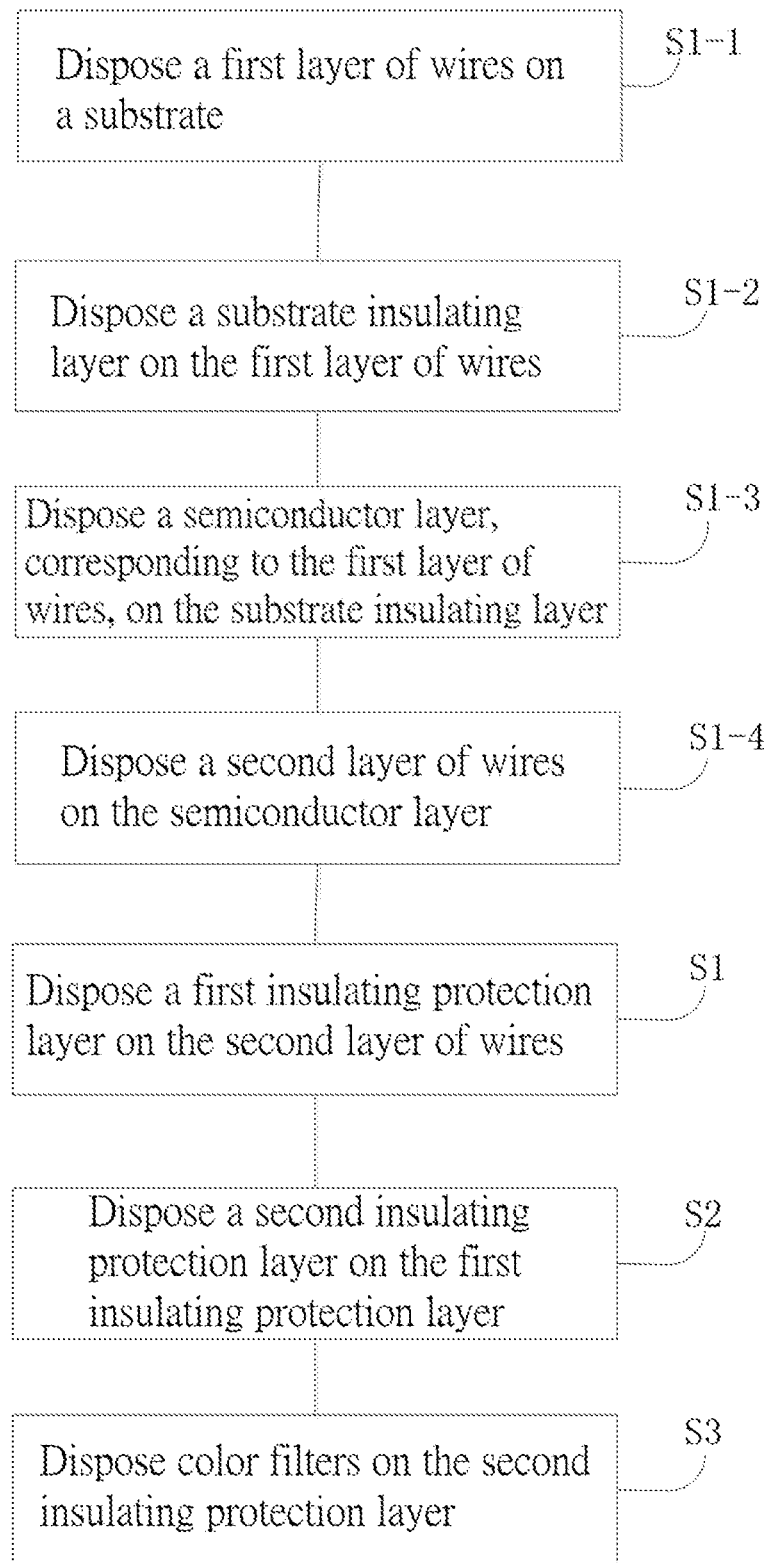
FIG. 7 is a schematic view showing another method of manufacturing the display panel according to the embodiment of this disclosure.

As shown in FIGS. 3 and 7, a method of manufacturing a display panel in the embodiment of FIGS. 3 and 7 comprises steps of: disposing a first layer of wires on a substrate 20; disposing an insulating layer 30 of the substrate 20 on the first layer of wires; disposing a semiconductor layer 43, corresponding to the first layer of wires, on the insulating layer 30 of the substrate 20; disposing a second layer of wires 50 on the semiconductor layer 43; disposing a first insulating protection layer 61 on the second layer of wires 50; disposing a second insulating protection layer 62 on the first insulating protection layer 61; and disposing color filters 70 on the second insulating protection layer 62.

The first insulating protection layer 61 and the second insulating protection layer 62 are disposed between the second layer of wires 50 and the color filters 70, and the first insulating protection layer 61 can be well stuck and combined with the second layer of wires 50 and the second insulating protection layer 62. The problem of the poor combination between the second layer of wires 50 and the second insulating protection layer 62 can be improved to avoid the problem of the peeling of the film or layer. Thus, the COA process quality can be improved, the product yield can be enhanced, and the manufacturing cost can be decreased. The first insulating protection layer 61 that is insulation and non-conductive does not affect the electrical performance of the second layer of wires 50. The second insulating protection layer 62 needs not to be changed, and it is only necessary to add a first insulating protection layer 61 between the second insulating protection layer 62 and the second layer of wires 50. The process change is small, and the influence to the method of manufacturing the display panel is smaller, thereby ensuring the stability of the display panel. There are two insulating protection layers 60 disposed between the second layer of wires 50 and the color filters 70, so that the second layer of wires 50 can be well isolated and protected from the color filters 70.

The second layer of wires 50 comprises, from bottom to top in order, a first molybdenum metal layer, a copper metal layer and a second molybdenum metal layer. The second layer of wires 50 are configured to have three layers of the molybdenum, copper and molybdenum structures. The uppermost layer is the second molybdenum metal layer having the better adhesive sticky property, the middle layer uses a metal copper or a copper alloy having a lower resistance characteristic to effectively reduce the resistance and the parasitic capacitance of the second layer of wires 50 of the display panel, and the first molybdenum metal layer and the second molybdenum metal layer of the second layer of wires 50 use a metal molybdenum or a molybdenum alloy having a better adhesion performance. In this manner, the intermediate copper metal layer may be stuck and fixed to the first molybdenum metal layer and the second molybdenum metal layer very well, while the intermediate copper metal layer may further be stuck and fixed to the upper and lower layers through the first molybdenum metal layer and the second molybdenum metal layer to have the better sticky property. The peeling of the intermediate copper metal layer and the upper and lower layers cannot be easily caused, the electrical performance of the second layer of wires 50 of the display panel can be well satisfied, the intermediate copper metal layer can be stuck and fixed to the upper and lower layers very well, the product yield can be increased, and the manufacturing cost can be decreased.

Figure 4:
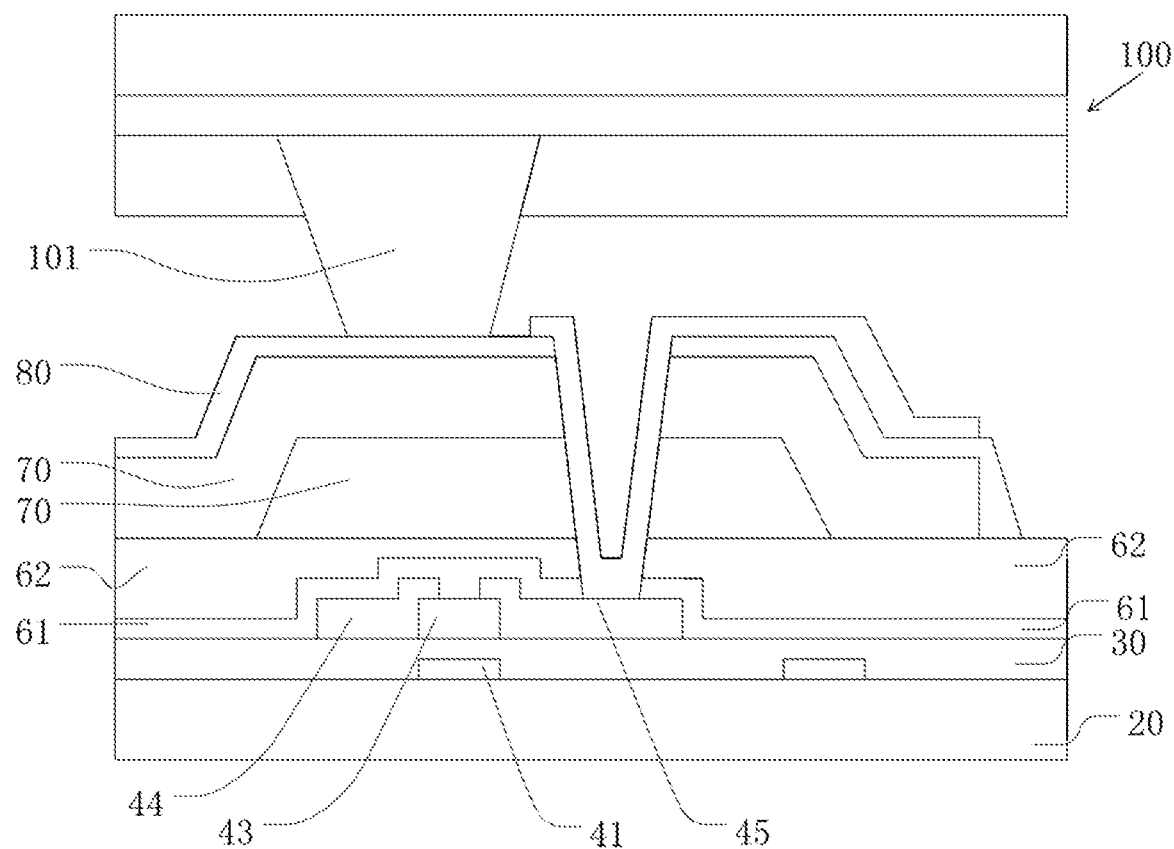
FIG. 4 is a schematic view showing the structure of the display panel according to the embodiment of this disclosure.

Referring to FIGS. 2 to 4, the display panel in the embodiment of FIGS. 2 to 4 comprises a substrate 20, a first layer of wires disposed on the substrate 20, an insulating layer 30 disposed on the first layer of wires, a second layer of wires 50 disposed on the insulating layer 30, a first insulating protection layer 61 disposed on the second layer of wires 50, a second insulating protection layer 62 disposed on the first insulating protection layer 61, and color filters 70 disposed on the second insulating protection layer 62.

The first insulating protection layer 61 and the second insulating protection layer 62 are disposed between the second layer of wires 50 and the color filters 70, and the first insulating protection layer 61 can be well stuck and combined with the second layer of wires 50 and the second insulating protection layer 62. The problem of the poor combination between the second layer of wires 50 and the second insulating protection layer 62 can be improved to avoid the problem of the peeling of the film or layer. Thus, the COA process quality can be improved, the product yield can be enhanced, and the manufacturing cost can be decreased. The first insulating protection layer 61 that is insulation and non-conductive does not affect the electrical performance of the second layer of wires 50. The second insulating protection layer 62 needs not to be changed, and it is only necessary to add a first insulating protection layer 61 between the second insulating protection layer 62 and the second layer of wires 50. The process change is small, and the influence to the method of manufacturing the display panel is smaller, thereby ensuring the stability of the display panel. There are two insulating protection layers 60 disposed between the second layer of wires 50 and the color filters 70, so that the second layer of wires 50 can be well isolated and protected from the color filters 70.

The first insulating protection layer 61 and the second insulating protection layer 62 are formed by depositing the same one material. In this embodiment, the first insulating protection layer 61 and the second insulating protection layer 62 are formed by depositing the same one material, but the deposition speeds are different. The deposition speed for forming the first insulating protection layer 61 is slower than the deposition speed for forming the second insulating protection layer 62. Additional raw materials are not needed, the raw material cost and the storage cost are decreased, and no new material needs to be added to the bill of materials. It is convenient to the flow manage and purchase. No additional apparatus for disposing the first insulating protection layer 61 is needed, and one set of equipment apparatus may be shared in forming the first insulating protection layer 61 and the second insulating protection layer 62.

A thickness of the first insulating protection layer 61 is less than a thickness of the second insulating protection layer 62. Since the thickness of the first insulating protection layer 61 is less than the thickness of the second insulating protection layer 62, the cost can be saved and the thickness of the display panel can be reduced.

In this embodiment, a thickness of the first insulating protection layer 61 is less than 1000 angstroms. Accordingly, the cost can be saved and the thickness of the display panel can be reduced. Optionally, the second insulating protection layer 62 can correspondingly reduce the thickness corresponding to the first insulating protection layer 61 without increasing the thickness of the display panel, and can facilitate the thinning of the display panel.

The width of the first insulating protection layer 61 is greater than the width of the top portion of the second layer of wires 50, so that the second layer of wires 50 may be in contact with the first insulating protection layer 61 with a maximum area. Accordingly, the adhesive fixation effect between the second layer of wires 50 and the first insulating protection layer 61 can be improved.

The first insulating protection layer 61, the second insulating protection layer 62 and the color filters 70 have the same width. It is convenient to the operation, and tends to implement that the first insulating protection layer 61, the second insulating protection layer 62 and the color filters 70 have the same width, and the width of the color filters 70 is greater than the width of the top portion of the second layer of wires 50. Of course and optionally, the width of the color filters 70 may be greater than the width of the bottom portion of the second layer of wires 50 to shelter the second layer of wires 50, and provide the effect of the black matrix (BM) very well.

The sticky property of the first insulating protection layer 61 is better than the sticky property of the second insulating protection layer 62. It is possible to select the first insulating protection layer 62, comprising but without limitation to, the natural resin, artificial resin, natural resin glue and artificial resin glue, having the sticky property better than the sticky property of the second insulating protection layer 62. The selections of materials are wide, the cost is low, and the second insulating protection layer 62 may be stuck and fixed to the second layer of wires 50 very well.

The second layer of wires 50 comprises, from bottom to top in order, a first molybdenum metal layer and a copper metal layer. Preferably, the second layer of wires 50 comprises, from bottom to top in order; a first molybdenum metal layer, a copper metal layer and a second molybdenum metal layer. The second layer of wires 50 are configured to have three layers of the molybdenum, copper and molybdenum structures. The uppermost layer is the second molybdenum metal layer having the better adhesive sticky property, the middle layer uses a metal copper or a copper alloy having a lower resistance characteristic to effectively reduce the resistance and the parasitic capacitance of the second layer of wires 50 of the display panel, and the first molybdenum metal layer and the second molybdenum metal layer of the second layer of wires 50 use a metal molybdenum or a molybdenum alloy having a better adhesion performance. In this manner, the intermediate copper metal layer may be stuck and fixed to the first molybdenum metal layer and the second molybdenum metal layer very well, while the intermediate copper metal layer may further be stuck and fixed to the upper and lower layers through the first molybdenum metal layer and the second molybdenum metal layer to have the better sticky property. The peeling of the intermediate copper metal layer and the upper and lower layers cannot be easily caused, the electrical performance of the second layer of wires 50 of the display panel can be well satisfied, the intermediate copper metal layer can be stuck and fixed to the upper and lower layers very well, the product yield can be increased, and the manufacturing cost can be decreased.

The display panel comprises an array substrate and a color filter substrate 100. The array substrate comprises a substrate 20, on which a first layer of wires are disposed. The first layer of wires comprises a wire segment of a gate 41. An insulating layer 30 is disposed on the first layer of wires. A semiconductor layer 43, corresponding to the wire segment of the gate 41 is disposed on the insulating layer 30. A second layer of wires 50 is disposed on the semiconductor layer 43. A source 44 and a drain 45 of the thin film transistor, which are separated from each other, are disposed on two ends of the semiconductor layer 43. A trench 46 is disposed between the source 44 and the drain 45. A bottom portion of the trench 46 is the semiconductor layer 43. The second layer of wires 50 comprise a wire segment of the source 44 and a wire segment of the drain 45 of the thin film transistor. The first insulating protection layer 61 is disposed on the second layer of wires 50. A second insulating protection layer 62 is disposed on the first insulating protection layer 61. Color filters 70 are disposed on the second insulating protection layer 62. The color filters 70 corresponding to the thin film transistor have two layers having different colors. Thus, the light passing the two layers of the color filters 70 is significantly reduced, thereby achieving the effect of the black matrix (BM). A passivation layer 80 is disposed on the color filters 70. A pixel electrode is further disposed on the passivation layer 80. The region of the two layers of the color filters 70 corresponding to the drain 45 is formed with a through hole, which further passes through the first insulating protection layer 61 and the second insulating protection layer 62, so that the pixel electrode contacts the drain 45 of the thin film transistor to implement the electrical connection. The first layer of wires may be formed adopting the structure of the second layer of wires. A liquid crystals and a spacer 101 are disposed between the array substrate and the color filter substrate 100.

Optionally, the first layer of wires are disposing between the substrate 20 and the insulating layer 30, the first layer of wires are scan lines of the display panel, and the second layer of wires 50 are data lines of the display panel.

In the above-mentioned embodiment the order of the color filters 70 in FIGS. 1 to 4 is not restricted, only one order is depicted in the drawing, and the order of RGB, GBR or BRG from left to right may further be adopted.

In the above-mentioned embodiment, the display panel comprises a liquid crystal panel, a plasma panel or the like. Taking the liquid crystal panel as an example, the liquid crystal panel comprises an array substrate and a color filter substrate (CF) disposed opposite to each other. A liquid crystal and a photo spacer (PS) are disposed between the array substrate and the color filter substrate. A thin film transistor (TFT) is disposed on the array substrate. The photo spacer may also be formed adopting the black photoresistance spacer (BPS).

In the above-mentioned embodiment, the material of the substrate may be selected from a glass material, a plastic material and the like.

In the above-mentioned embodiment, the color filter substrate may comprise a TFT array, wherein the color filter and the TFT array may be formed on the same substrate, and the array substrate may comprise a color filter layer.

In the above-mentioned embodiment, the display panel of this disclosure may be a curved panel.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A method of manufacturing a display panel, comprising steps of:
   disposing a first layer of wires on a substrate, wherein the first layer of wires comprises, from bottom to top in order, a first molybdenum metal layer, a copper metal layer and a second molybdenum metal layer;
   disposing a substrate insulating layer on the first layer of wires;
   disposing a semiconductor layer, corresponding to the first layer of wires, on the substrate insulating layer;
   disposing a second layer of wires on the semiconductor layer;
   disposing a first insulating protection layer on the second layer of wires;
   disposing a second insulating protection layer on the first insulating protection layer, wherein a deposition speed of the first insulating protection layer is lower than a deposition speed of the second insulating protection layer; and
   disposing color filters on the second insulating protection layer, wherein:
   the first insulating protection layer and the second insulating protection layer are formed by depositing the same one material;

a thickness of the first insulating protection layer is less than a thickness of the second insulating protection layer;

the thickness of the first insulating protection layer is less than 1000 angstroms;

a width of the first insulating protection layer is greater than a width of a top portion of the second layer of wires;

the first insulating protection layer, the second insulating protection layer and the color filters have the same width; and the second layer of wires comprise, from bottom to top in order, a first molybdenum metal layer, a copper metal layer and a second molybdenum metal layer;

wherein a sticky property of the first insulating protection layer is better than a sticky property of the second insulating protection layer, the second insulating protection layer is stuck and fixed to the second layer of wires, and the first insulating protection layer comprises natural resin, artificial resin, natural resin glue or artificial resin glue.

2. A method of manufacturing a display panel, comprising steps of:

disposing a first insulating protection layer on a second layer of wires;

disposing a second insulating protection layer on the first insulating protection layer, wherein a deposition speed of the first insulating protection layer is lower than a deposition speed of the second insulating protection layer; and disposing color filters on the second insulating protection layer;

wherein a sticky property of the first insulating protection layer is better than a sticky property of the second insulating protection layer, the second insulating protection layer is stuck and fixed to the second layer of wires, and the first insulating protection layer comprises natural resin, artificial resin, natural resin glue or artificial resin glue.

3. The method of manufacturing the display panel according to claim 2, wherein the first insulating protection layer and the second insulating protection layer are formed by depositing the same one material.

4. The method of manufacturing the display panel according to claim 2, wherein a thickness of the first insulating protection layer is less than a thickness of the second insulating protection layer.

5. The method of manufacturing the display panel according to claim 2, wherein a thickness of the first insulating protection layer is less than 1000 angstroms.

6. The method of manufacturing the display panel according to claim 2, wherein a width of the first insulating protection layer is greater than a width of a top portion of the second layer of wires.

7. The method of manufacturing the display panel according to claim 2, wherein the first insulating protection layer, the second insulating protection layer and the color filters have the same width.

8. The method of manufacturing the display panel according to claim 2, wherein the second layer of wires comprise, from bottom to top in order, a first molybdenum metal layer, a copper metal layer and a second molybdenum metal layer.

9. The method of manufacturing the display panel according to claim 2, wherein the first insulating protection layer and the second insulating protection layer are formed by depositing the same one material, and a thickness of the first insulating protection layer is less than a thickness of the second insulating protection layer.

10. The method of manufacturing the display panel according to claim 2, wherein a thickness of the first insulating protection layer is less than a thickness of the second insulating protection layer, and the thickness of the first insulating protection layer is less than 1000 angstroms.

11. The method of manufacturing the display panel according to claim 2, wherein the first insulating protection layer and the second insulating protection layer are formed by depositing the same one material, and a thickness of the first insulating protection layer is less than 1000 angstroms.

12. The method of manufacturing the display panel according to claim 2, wherein the first insulating protection layer and the second insulating protection layer are formed by depositing the same one material, a thickness of the first insulating protection layer is less than a thickness of the second insulating protection layer, and the thickness of the first insulating protection layer is less than 1000 angstroms.

13. The method of manufacturing the display panel according to claim 2, wherein a width of the first insulating protection layer is greater than a width of a top portion of the second layer of wires, and the first insulating protection layer, the second insulating protection layer and the color filters have the same width.

14. The method of manufacturing the display panel according to claim 2, wherein a width of the first insulating protection layer is greater than a width of a top portion of the second layer of wires, and the second layer of wires comprise, from bottom to top in order, a first molybdenum metal layer, a copper metal layer and a second molybdenum metal layer.

15. The method of manufacturing the display panel according to claim 2, wherein a width of the first insulating protection layer is greater than a width of a top portion of the second layer of wires, and the second layer of wires comprise, from bottom to top in order, a first molybdenum metal layer, a copper metal layer and a second molybdenum metal layer.

16. The method of manufacturing the display panel according to claim 2, wherein a width of the first insulating protection layer is greater than a width of a top portion of the second layer of wires, the first insulating protection layer, the second insulating protection layer and the color filters have the same width, and the second layer of wires comprise, from bottom to top in order, a first molybdenum metal layer, a copper metal layer and a second molybdenum metal layer.

17. The method of manufacturing the display panel according to claim 2, further comprising steps of:

disposing a first layer of wires on a substrate;

disposing a substrate insulating layer on the first layer of wires;

disposing a semiconductor layer, corresponding to the first layer of wires, on the substrate insulating layer; and disposing the second layer of wires on the semiconductor layer.

18. The method of manufacturing the display panel according to claim 17, wherein the second layer of wires comprise, from bottom to top in order, a first molybdenum metal layer, a copper metal layer and a second molybdenum metal layer.

19. The method of manufacturing the display panel according to claim 17, wherein the first layer of wires comprise, from bottom to top in order, a first molybdenum metal layer, a copper metal layer and a second molybdenum metal layer.

20. The method of manufacturing the display panel according to claim 17, wherein the first layer of wires comprise, from bottom to top in order, a first molybdenum metal layer, a copper metal layer and a second molybdenum metal layer, and the second layer of wires comprise, from bottom to top in order, a first molybdenum metal layer, a copper metal layer and a second molybdenum metal layer.

* * * * *